(12) United States Patent
Kleyn

(10) Patent No.: US 11,401,087 B2
(45) Date of Patent: Aug. 2, 2022

(54) VENTED GROOVED FOAM LINER WITH A FOIL LAYER FOR TEMPORARY VENTING

(71) Applicant: Selig Grand Rapids LLC, Grand Rapids, MI (US)

(72) Inventor: Stephen Bernard Kleyn, Hudsonville, MI (US)

(73) Assignee: Selig Grand Rapids LLC, Grand Rapids, MI (US)

( * ) Notice: Subject to any disclaimer, the term of this patent is extended or adjusted under 35 U.S.C. 154(b) by 216 days.

(21) Appl. No.: 16/539,043

(22) Filed: Aug. 13, 2019

(65) Prior Publication Data

US 2020/0047959 A1 Feb. 13, 2020

Related U.S. Application Data

(60) Provisional application No. 62/718,161, filed on Aug. 13, 2018.

(51) Int. Cl.
| | |
|---|---|
| *B32B 3/24* | (2006.01) |
| *B65D 51/16* | (2006.01) |
| *B65D 41/04* | (2006.01) |
| *B32B 3/30* | (2006.01) |
| *B32B 5/18* | (2006.01) |
| *B32B 15/085* | (2006.01) |
| *B32B 15/04* | (2006.01) |
| *B32B 3/26* | (2006.01) |

(52) U.S. Cl.
CPC .............. *B65D 51/16* (2013.01); *B32B 3/266* (2013.01); *B32B 3/30* (2013.01); *B32B 5/18* (2013.01); *B32B 15/046* (2013.01); *B32B 15/085* (2013.01); *B65D 41/045* (2013.01); *B32B 2435/02* (2013.01)

(58) Field of Classification Search
CPC ..................................................... B65D 51/16
See application file for complete search history.

(56) References Cited

U.S. PATENT DOCUMENTS 5,730,306 A * 3/1998 Costa ................. B65D 51/1616
                                                        215/261
2018/0134458 A1* 5/2018 Lloyd .................. B65D 41/023

\* cited by examiner

*Primary Examiner* — William P Watkins, III
(74) *Attorney, Agent, or Firm* — Fitch, Even, Tabin & Flannery, LLP

(57) ABSTRACT

A vented grooved foam liner cap system for attachment to a container, including a vented foam liner having a grooved distal side that can be actuated from an open state to a sealed state within a cap of a container by a sealing mechanism. A method of equilibrating pressure and sealing a container, by venting contents of a container through the vented grooved foam liner cap system attached to the container, and after the contents have cooled to a desired temperature, stopping venting, thereby providing pressure equilibration to the container, and sealing the container by activating a sealing mechanism in the vented grooved foam liner cap system.

19 Claims, 4 Drawing Sheets

VENTED GROOVED FOAM LINER WITH A FOIL LAYER FOR TEMPORARY VENTING

BACKGROUND OF THE INVENTION

1. Technical Field

The present invention relates to liners for covering bottles and containers. More specifically, the present invention relates to liners with venting capabilities in two stages.

2. Background Art

There are currently many ways a cap can be made into a vented version to provide pressure equilibration between the inside and outside of a package such as a bottle or other similar container. A challenge arises when there is a specific need to allow controlled venting of a product for a time after filling the package, but then to have the venting stop before the package continues on through the distribution process. For example, when a bottle is filled with a hot liquid during the manufacturing process, deformation occurs. After placing a cap on a hot-filled bottle, the package will generate an internal vacuum as it cools, due to the reduction of molecular movement and thus a reduction in the pressure exerted on the walls of the container. As the cooling occurs, a vacuum forms inside the sealed package and can begin to collapse the sides of the bottle if it cannot withstand the pressure generated.

There are currently no adequate solutions to allow venting for only a short time after filling a bottle or container with hot fluids, and therefore, there is a need for an effective cap system that allows for venting and pressure equilibration for only a controlled amount of time.

SUMMARY OF THE INVENTION

The present invention provides for a vented grooved foam liner cap system for attachment to a container, including a vented foam liner having a grooved distal side that can be actuated from an open state to a sealed state within a cap of a container by a sealing mechanism.

The present invention provides for a method of equilibrating pressure and sealing a container, by venting contents of a container through the vented grooved foam liner cap system attached to the container, and after the contents have cooled to a desired temperature, stopping venting, thereby providing pressure equilibration to the container, and sealing the container by activating a sealing mechanism in the vented grooved foam liner cap system.

DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

Figure 1:
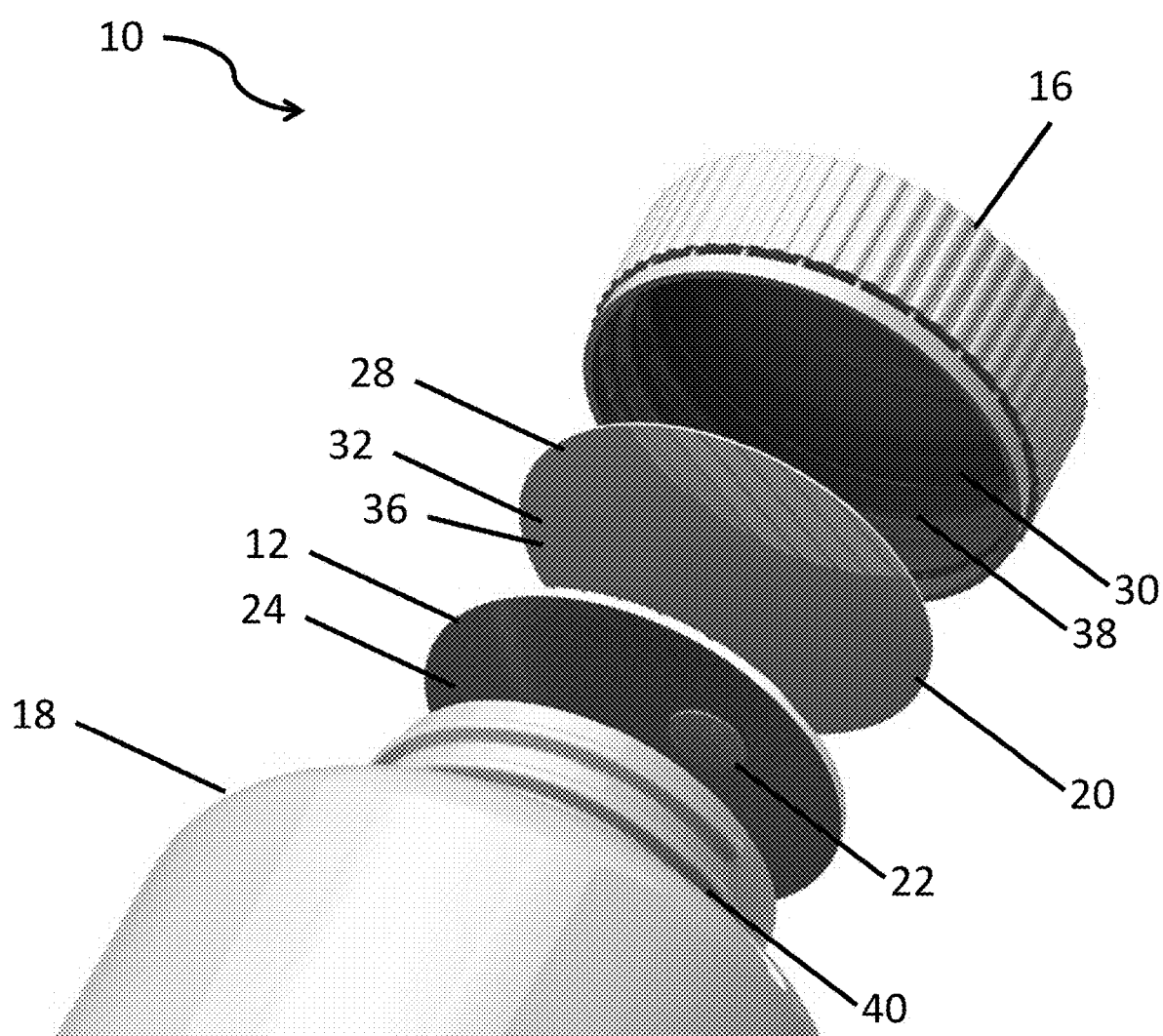
FIG. 1 is an exploded view of the vented grooved foam liner cap system showing a membrane vent.

The present invention provides for a vented grooved foam liner cap system for attachment to a container, shown generally in the FIGURES at 10, and method of providing pressure equilibration and sealing a container, especially one filled with hot contents. The system 10 includes a vented foam liner 12 having a grooved distal side 14 that can be actuated from an open state to a sealed state within a cap 16 of a container 18 by a sealing mechanism 20.

"Contents" as used herein, can refer to liquids or solids.

Figure 2:
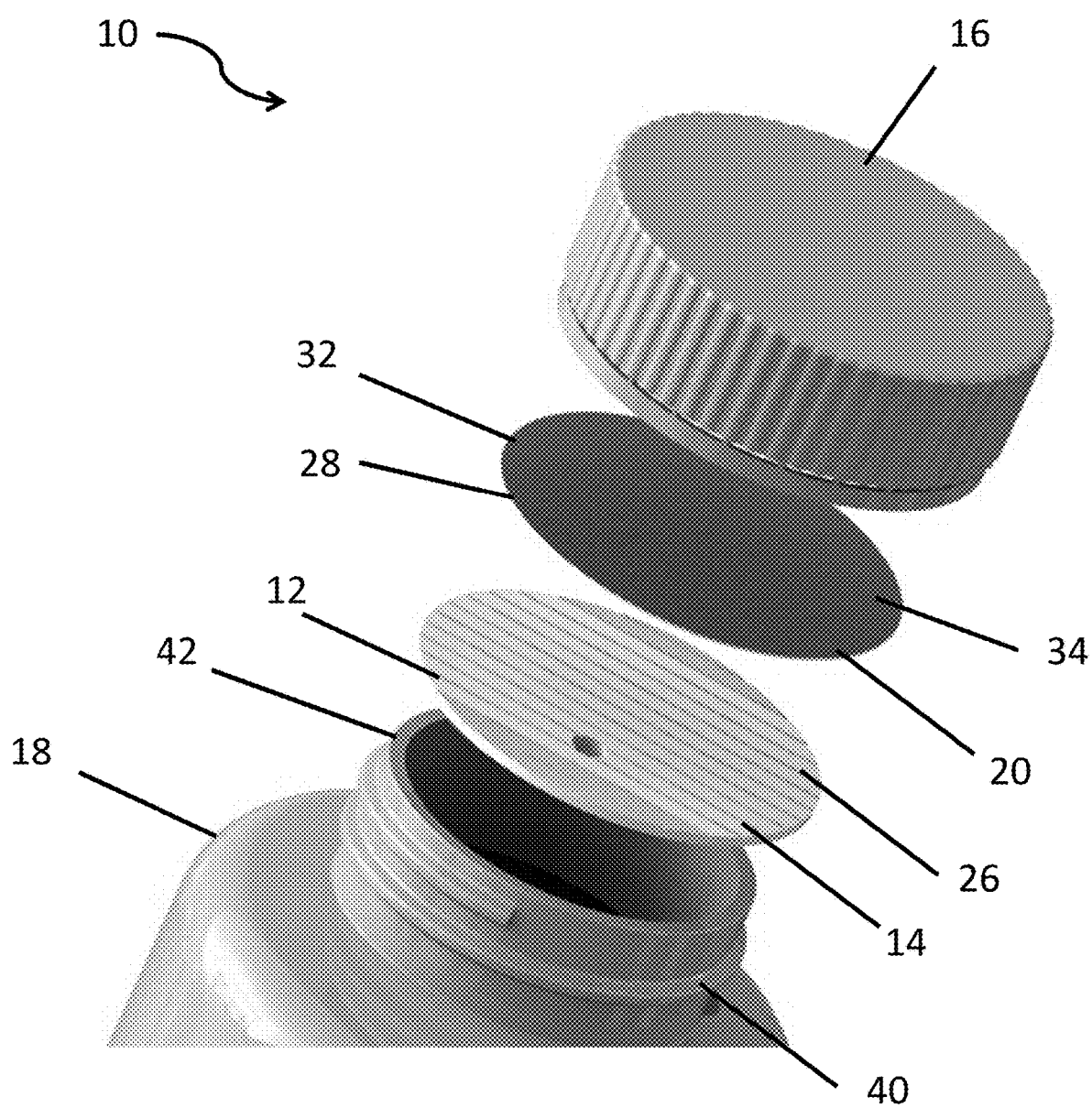
FIG. 2 is an exploded view of the vented grooved foam liner cap system showing a grooved distal side of a vented foam liner.

The vented foam liner 12, shown in detail in FIGS. 1 and 2, includes a membrane vent 22 applied to a flat proximal side 24. Any suitable membrane vent 22 can be used. The membrane vent 22 can consist of any porous material allowing the transmission of air while preventing any of the packaged contents to escape the container 18. The vented foam liner 12 can be any kind resealable foam liner with a flat sealing side 24 and a grooved venting side 14. The grooved distal side 14 includes multiple grooves 26 that can be any desired width or depth to provide adequate venting of the contents in the container 18. The grooves 26 can cover the entire grooved distal side 14 or a portion of the grooved distal side 14, i.e. at least a portion of the distal side 14 is grooved. The grooves 26 on the venting side 14 of the vented foam liner 12 can be made in any geometry or pattern allowing air to pass over them or through them to provide venting to the container 18, while not compromising sealing to the container 18.

Figure 3:
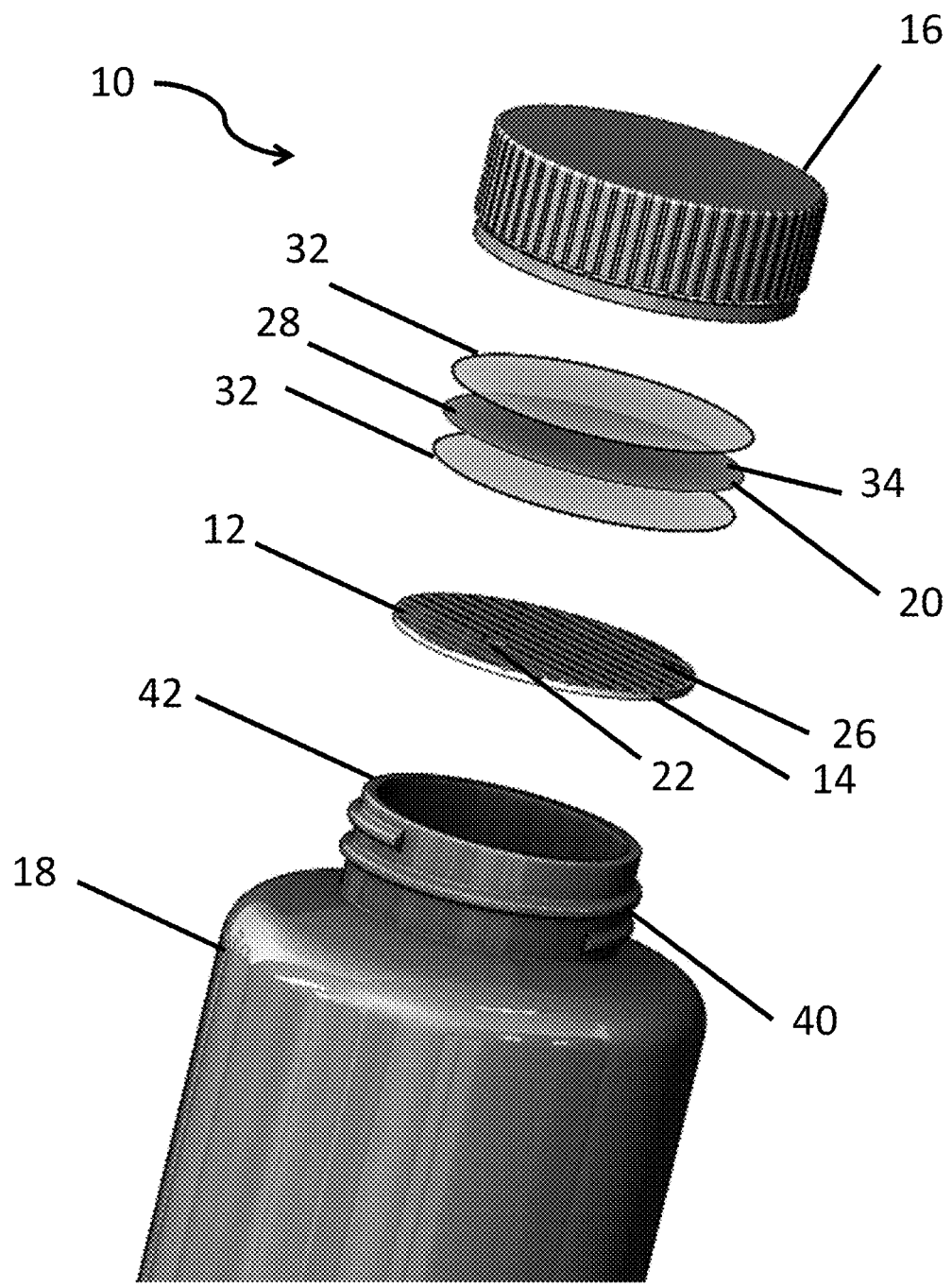
FIG. 3 is an exploded view of the vented grooved foam liner cap system showing a grooved distal side of a vented foam liner and sealing layers.
Figure 4:
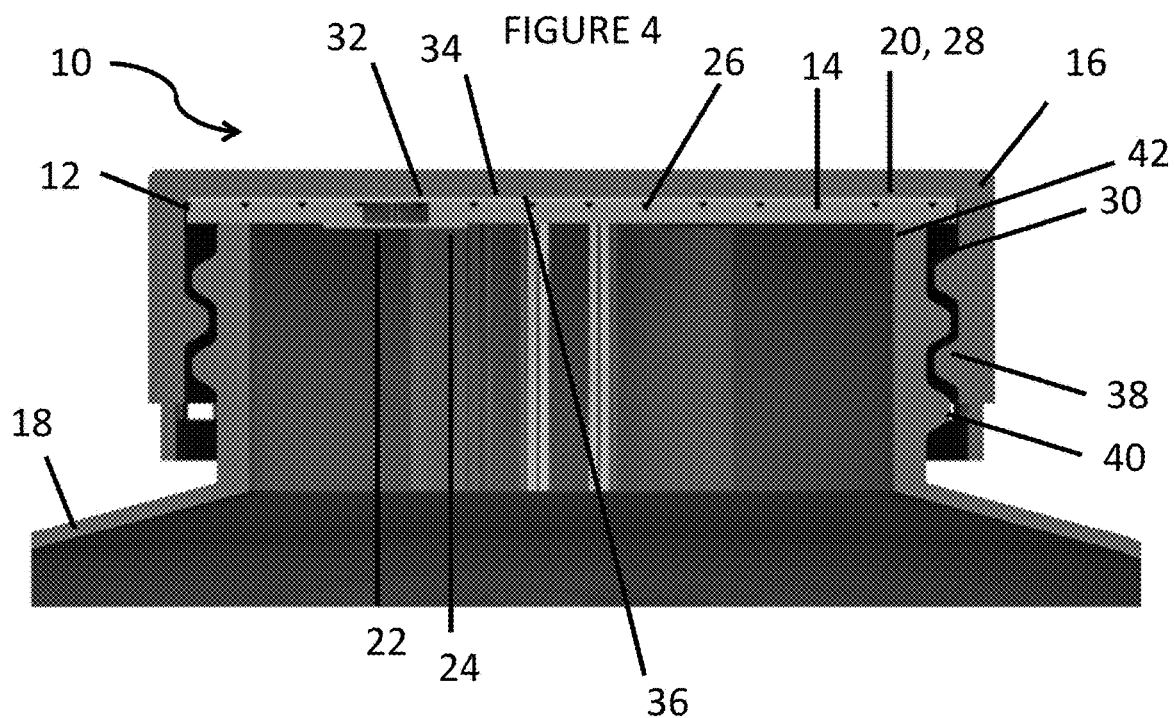
FIG. 4 is a cross-sectional view of the vented grooved foam liner cap system on a container in a venting state.
Figure 5:
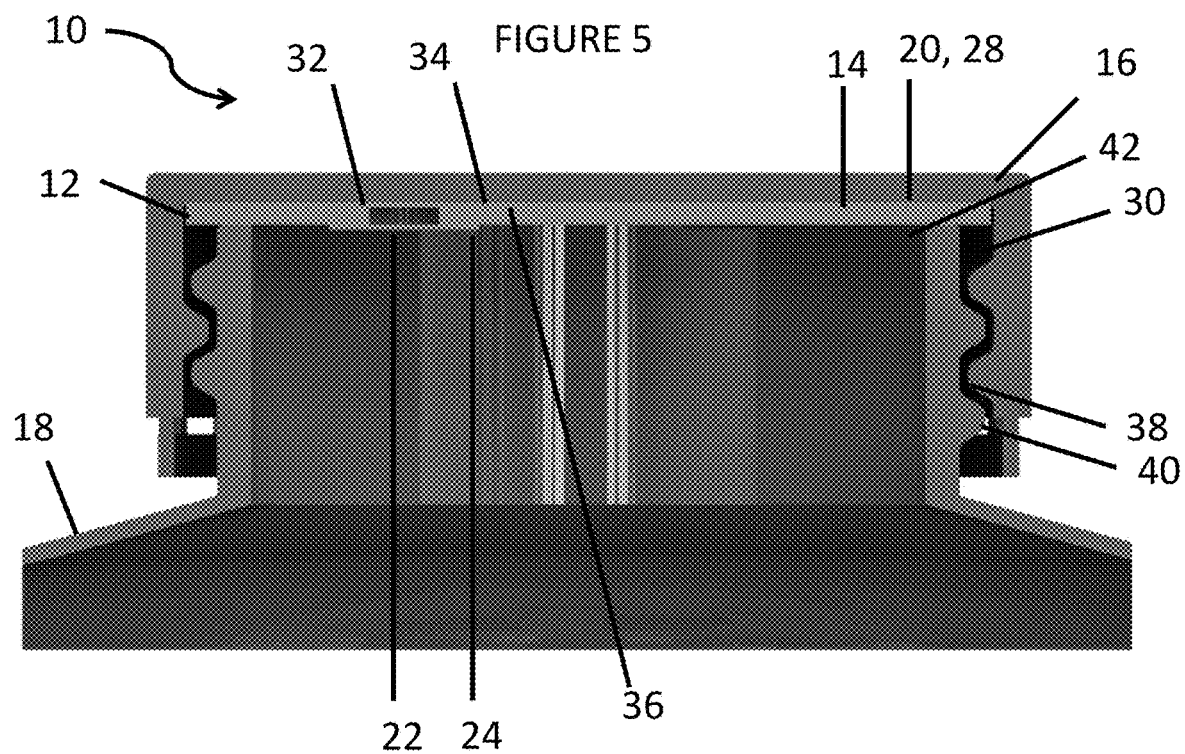
FIG. 5 is a cross-sectional view of the vented grooved foam liner cap system on a container in a sealed state.

The sealing mechanism 20 is a foil layer 28 between the grooved distal side 14 of the vented foam liner 12 and an inner surface 30 of the cap 16. The foil layer 28 can include a laminated polymer sealing layer 32 on one or both sides of the foil layer 28 made of various materials (FIG. 3 shows the laminated polymer sealing layer 32 on both sides). For example, the laminated polymer sealing layer 32 can be made of polypropylene on a distal side 34 for attaching the foil layer 28 to the inner surface 30 of the cap 16. The laminated polymer sealing layer 32 can be made of low density polyethylene on a proximal side 36 for attaching the foil layer 28 to the grooved distal side 14 of the vented foam liner 12. While in a cooling state, the foil layer 28 rests on top of the vented foam liner 12 and under the cap 16, shown in FIG. 4. After the contents have cooled to the desired temperature, with an induction sealing process, the foil layer 28 melts the grooves 26 closed by flattening them, seals itself to the vented foam liner 12, and seals itself to the cap 16, shutting off the venting and providing a fully sealed container 18, shown in FIG. 5. The cap 16 with the vented foam liner 12 completely covers and engages a mouth opening 42 of the container 18, fully sealing the contents of the container 18.

The cap 16 can be made of plastic or any other suitable materials and can be designed to reflect current external cap cosmetics. The cap 16 includes internal ribs 38 on the inner surface 30 that engage external ribs 40 of the container 18.

The present invention provides for a method of equilibrating pressure and sealing a container, by venting contents of a container 18 through the vented grooved foam liner cap system 10 attached to the container 18, and after the contents have cooled to a desired temperature, stopping venting, thereby providing pressure equilibration to the container 18, and sealing the container 18 by activating a sealing mechanism 20. The contents of the container 18 are vented through the membrane vent 22 and through the grooves 26 of the vented foam liner 12. After the contents have cooled to the desired temperature, the sealing mechanism 20 is activated through induction heating, the venting through the grooves 26 is stopped, the foil layer 28 is sealed to the vented foam liner 12 and sealed to the cap 16, and a fully sealed container is provided.

The vented grooved foam liner cap system 10 provides several advantages. This design allows a package to cool until venting is no longer desired. Temporary venting of the package allows manufacturers to assure that the venting does not affect the stability of their products over the desired shelf life. The manufacturer can control the time allowed for venting for a specific desired time and in a controlled environment. Currently, manufacturers must incorporate complex designs into a bottle to provide strategic areas that collapse as a vacuum forms. The present invention allows for the use of common, thin walled, and less complex bottle designs. Manufacturers can utilize the same equipment currently used in the manufacturing process. Manufacturers often use cold-water cooling tunnels to reduce the temperature of bottles before final packaging, and this invention allows them to continue to use this process with little concern to contaminating the vent with water and blocking off the venting air path. The invention has been created such that it can be used in correlation with materials familiar to the industry, such as: traditional bottles, lining materials, and venting membranes, without requiring complex material changes. The invention will introduce minimal changes to existing package cosmetic design and will not interrupt the consumer experience.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A vented grooved foam liner cap system for attachment to a container, comprising:
   a vented foam liner having a grooved distal side that can be actuated from an open state to a sealed state within a cap of a container by deforming at least one groove on the grooved distal side by a sealing mechanism.

2. The vented grooved foam liner cap system of claim 1, wherein said container is filled with a substance chosen from the group consisting of a liquid and solid.

3. The vented grooved foam liner cap system of claim 1, wherein said vented foam liner includes a membrane vent applied to a flat proximal side that allows transmission of air and prevents contents in said container from escaping.

4. The vented grooved foam liner cap system of claim 1, wherein said vented foam liner is resealable.

5. The vented grooved foam liner cap system of claim 1, wherein said grooved distal side is grooved covering at least a portion of said grooved distal side.

6. The vented grooved foam liner cap system of claim 1, wherein said sealing mechanism includes a foil layer between said grooved distal side and an inner surface of said cap.

7. The vented grooved foam liner cap system of claim 6, wherein said foil layer includes a laminated polymer sealing layer on at least one side of said foil layer.

8. The vented grooved foam liner cap system of claim 6, wherein said laminated polymer sealing layer is made of polypropylene on a distal side of said foil layer, and wherein said laminated polymer sealing layer is made of low density polyethylene on a proximal side of said foil layer.

9. The vented grooved foam liner cap system of claim 6, wherein while in a cooling state, said foil layer rests on top of said vented foam liner and under said cap, and with an induction sealing process said foil layer melts grooves of said grooved distal side closed, seals itself to said vented foam liner, and seals itself to said cap.

10. A method of equilibrating pressure and sealing a container, including the steps of:
    venting contents of a container through a vented grooved foam liner cap system attached to the container; and
    after the contents have cooled to a desired temperature, stopping venting, thereby providing pressure equilibration to the container, and sealing the container by activating a sealing mechanism in the vented grooved foam liner cap system.

11. The method of claim 10, wherein the vented grooved foam liner cap system includes a vented foam liner having a grooved distal side that can be actuated from an open state to a sealed state within a cap of a container by the sealing mechanism.

12. The method of claim 11, wherein the vented foam liner includes a membrane vent applied to a flat proximal side that allows transmission of air and prevents contents in the container from escaping.

13. The method of claim 10, wherein said step of activating a sealing mechanism is further defined as a foil layer melting grooves of the grooved distal side closed, sealing the foil layer to the vented foam liner, and sealing the foil layer to the cap, thereby fully sealing the container.

14. The method of claim 13, wherein said melting step is actuated by induction heating.

15. A liner system for temporarily venting a container, the system comprising:
    a liner including a top side having a grooved upper surface and a lower side, the liner defining an aperture extending between the top side and the lower side, the aperture extending to at least one groove in the grooved upper surface;
    a venting membrane covering the aperture; and
    an induction heating layer positioned adjacent the liner to provide heat to the grooved upper surface during a heating process to actuate the grooved upper surface from an open state to a sealed state.

16. The liner system of claim 15 wherein the liner comprises a foam layer.

17. The liner system of claim 15 wherein the liner bottom side comprises a liner surface area and the venting membrane has a venting membrane surface area that is less than the liner surface area.

18. The liner system of claim 15 further comprising a polymer layer between the grooved upper surface and the induction heating layer.

19. The liner system of claim 15 wherein the induction heating layer heats at least a portion of the grooved upper surface to melt at least one groove.

\* \* \* \* \*